US007303840B2

(12) United States Patent
Thackeray et al.

(10) Patent No.: US 7,303,840 B2
(45) Date of Patent: Dec. 4, 2007

(54) MANGANESE OXIDE COMPOSITE ELECTRODES FOR LITHIUM BATTERIES

(75) Inventors: Michael M. Thackeray, Naperville, IL (US); Christopher S. Johnson, Naperville, IL (US); Naichao Li, Croton on Hudson, NY (US)

(73) Assignee: UChicago Argonne, LLC, Chicago, IL (US)

( * ) Notice: Subject to any disclaimer, the term of this patent is extended or adjusted under 35 U.S.C. 154(b) by 481 days.

(21) Appl. No.: 11/057,790

(22) Filed: Feb. 14, 2005

(65) Prior Publication Data

US 2006/0051671 A1    Mar. 9, 2006

Related U.S. Application Data

(60) Provisional application No. 60/607,125, filed on Sep. 3, 2004.

(51) Int. Cl.
*H01M 4/58* (2006.01)
*H01M 4/50* (2006.01)
*H01M 4/54* (2006.01)
*C01G 45/12* (2006.01)

(52) U.S. Cl. ............ 429/231.95; 429/223; 429/224; 429/231.1; 429/231.5; 429/231.6; 423/599

(58) Field of Classification Search .............. 429/223, 429/224, 231.1, 231.3, 231.5, 231.6, 231.96; 423/559
See application file for complete search history.

(56) References Cited

U.S. PATENT DOCUMENTS

| | | | |
|---|---|---|---|
| 4,507,371 | A | 3/1985 | Thackeray et al. |
| 5,240,794 | A | 8/1993 | Thackeray et al. |
| 5,316,877 | A | 5/1994 | Thackeray et al. |
| 6,660,432 | B2 | 12/2003 | Paulsen et al. |
| 6,677,082 | B2 | 1/2004 | Thackeray et al. |
| 6,680,143 | B2 | 1/2004 | Thackeray et al. |
| 2003/0027048 | A1 | 2/2003 | Dahn et al. |
| 2003/0108793 | A1 | 6/2003 | Dahn et al. |

OTHER PUBLICATIONS

James C. Hunter, Preparation of a New Form of Manganese Dioxide, Journal of Solid State Chemistry, 39, 142 (1981).
M.H. Rossouw, et al., Lithium Manganese Oxides From Li2MnO3 For Rechargeable Lithium Battery Applications, Materials Research Bulletin, 26, 463 (1991).
M. H. Rossouw, A. de Kock, L. A. de Picciotto and M. M. Thackeray, Mater. Res. Bull. 25, 173 (1990).
A. de Kock, M. H. Rossouw, L. A. de Picciotto and M. M. Thackeray, Mater. Res. Bull. 25, 657 (1990).
M. M. Thackeray, M. H. Rossouw, A. de Kock, A. P. la Harpe, R. J. Gummow, K. Pearce and D. C. Liles, J. Power Sources, 43-44, 289 (1993).
M. M. Thackeray, Progress in Solid State Chemistry, 25, 1 (1997).

P. Kalyani, S. Chitra, T. Mohan and S. Gopukumar, J. Power Sources, 80, 103 (1999).
K. Numata and S. Yamanaka, Solid State Ionics, 118, 117 (1999).
C. S. Johnson and M. M. Thackeray, in: Interfaces, Phenomena, and Nanostructures in Lithium Batteries, The Electrochem. Soc. Inc., Proc. PV 2000-36, 47 (2001).
M. Balasubramanian, J. McBreen, I. J. Davidson, P. S. Whitfield and I. Kargina, J. Electrochem. Soc., 149 (2002) A176.
B. Ammundsen, J. Paulsen, I. Davidson, R-S. Liu, C-H. Shen, J-M. Chen, L-Y. Yang and J-F Lee, J. Electeochem. Soc., 149, A431 (2002).
Z. Lu and J. R. Dahn, J. Electrochem. Soc., 149, A778 (2002).
Z. Lu and J. R. Dahn, J. Electrochem. Soc., 149, A815 (2002).
A. Robertson and P. G. Bruce, J. Chem. Soc., Chem. Comm. 2790 (2002).
J-S. Kim, C. S. Johnson and M. M. Thackeray, Electrochem. Comm., 4, 205 (2002).
A. R. Armstrong and P. G. Bruce, Electrochem. Solid State Lett., 7, A1 (2004).
J-S. Kim, C. S. Johnson, J. T. Vaughey, M. M. Thackeray, S. A. Hackney, W. Yoon and C. P. Grey, Chem Mater., 16, 1996 (2004).
C. S. Johnson, J-S. Kim, C. Lefief, N. Li, J. T. Vaughey and M. M. Thackeray, Electrochem. Comm. 6, 1085 (2004).
J-S. Kim, C. S. Johnson, J. T. Vaughey and M. M. Thackeray, J. Power Sources (2004). Submitted.
M. N. Richard, E. W. Fuller and J. R. Dahn, Solid State Ionics, 73, 81 (1994).
Y. Shin and A. Manthiram, Electrochem. Solid State Lett., 6, A249 (2003).
Y. Shao-Horn, S. A. Hackney, A. R. Armstrong, P. G. Bruce, R. Gitzendanner, C. S. Johnson and M. M. Thackeray, J. Electrochem. Soc., 146, 2404 (1999).
P. G. Bruce, A. R. Armstrong and R. Gitzendanner, J. Mater. Chem., 9, 193 (1999).
T. E. Quine, M. J. Duncan, A. R. Armstrong, A. D. Robertson and P. G. Bruce, J. Mater. Chem., 10, 2828 (2000).
A. D. Robertson, A. R. Armstrong, A. J. Fowkes and P. G. Bruce, J. Mater. Chem., 11, 113 (2001).
A. D. Robertson, A. R. Armstrong, A. J. Patterson, M. J. Duncan and P. G. Bruce, J. Mater. Chem., 13, 2367 (2003).
A. D. Robertson and P. G. Bruce, Chem. Mater., 15, 1984 (2004).

*Primary Examiner*—Patrick Joseph Ryan
*Assistant Examiner*—Thomas H. Parsons
(74) *Attorney, Agent, or Firm*—Olson & Hierl, Ltd; Harry M. Levy

(57) ABSTRACT

An activated electrode for a non-aqueous electrochemical cell is disclosed with a precursor of a lithium metal oxide with the formula $xLi_2MnO_3 \cdot (1-x)LiMn_{2-y}M_yO_4$ for $0<x<1$ and $0 \leq y<1$ in which the $Li_2MnO_3$ and $LiMn_{2-y}M_yO_4$ components have layered and spinel-type structures, respectively, and in which M is one or more metal cations. The electrode is activated by removing lithia, or lithium and lithia, from the precursor. A cell and battery are also disclosed incorporating the disclosed positive electrode.

20 Claims, 12 Drawing Sheets

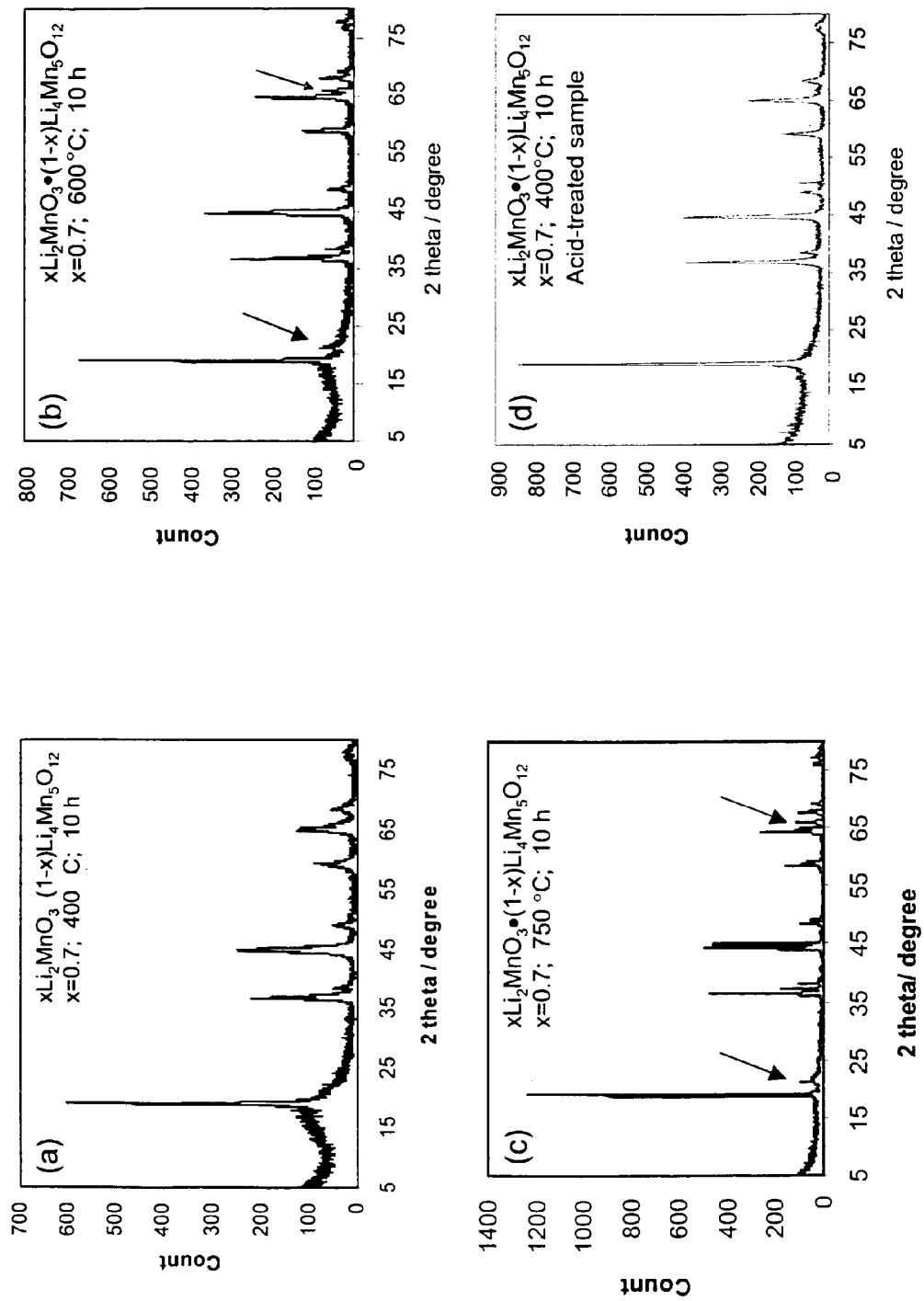
FIGURE 2(a-d)

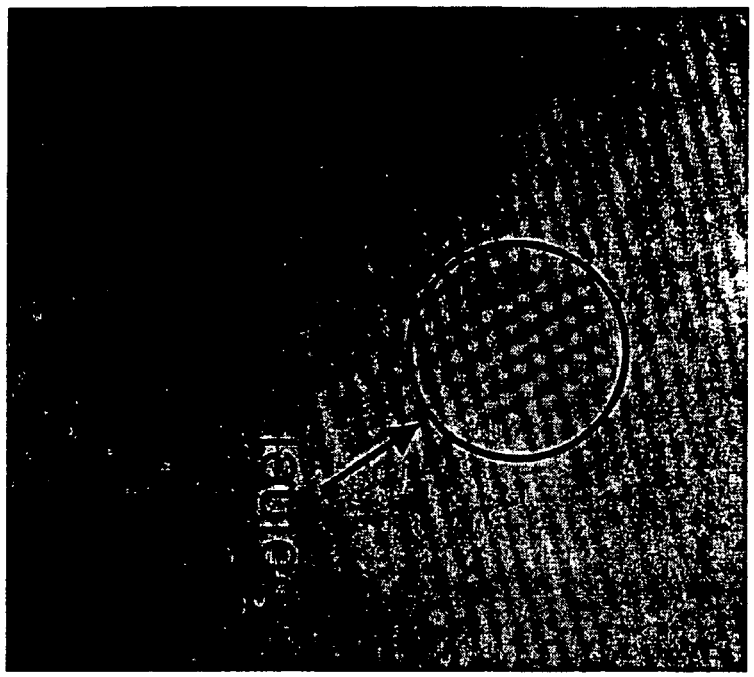
FIGURE 3(a-b)

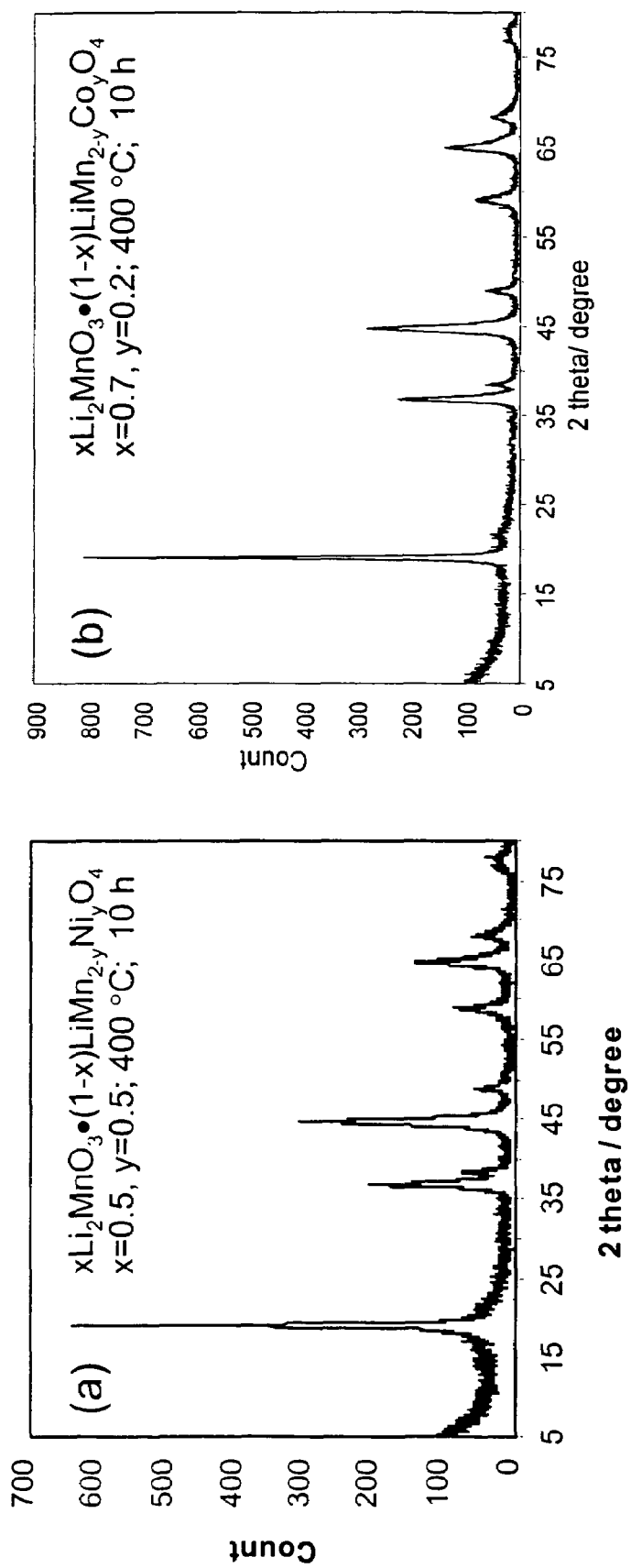
FIGURE 4(a-b)

US 7,303,840 B2

MANGANESE OXIDE COMPOSITE ELECTRODES FOR LITHIUM BATTERIES

RELATED APPLICATIONS

This application, pursuant to 37 C. F. R. 1.78(c), claims priority based on provisional application Ser. No. 60/607,125 filed on Sep. 3, 2004 and PCT Application Ser. No. PCT/US2004/038377 filed Nov. 17, 2004.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

This invention relates to lithium-metal-oxide electrodes for non-aqueous lithium cells and batteries. Lithium cells and batteries are used widely to power numerous devices, such as those used in electronic, medical, transportation, aerospace and defense systems.

SUMMARY OF THE INVENTION

This invention relates to metal oxide electrodes for non-aqueous lithium cells and batteries. More specifically, the invention relates to activated electrodes having, as a precursor thereof, a lithium metal oxide containing manganese with the formula $xLi_2MnO_3 \cdot (1-x)LiMn_{2-y}M_yO_4$ for $0<x<1$ and $0 \leq y<1$ in which the $Li_2MnO_3$ and $LiMn_{2-y}M_yO_4$ components have layered and spinel-type structures, respectively, and in which M is one or more metal cations, said activated electrode being activated by removing lithia ($Li_2O$), or lithium and lithia, from said precursor, the M cations being selected from one or more monovalent, divalent, trivalent or tetravalent cations, preferably from $Li^+$, $Mg^{2+}$, $Ni^{2+}$, $Ni^{3+}$, $Co^{2+}$, $Co^{3+}$, $Al^{3+}$, $Ti^{4+}$ and $Zr^{4+}$ ions. Partial substitution of the manganese ions, or lithium and manganese ions, by M cations of the layered $Li_2MnO_3$ component may occur during synthesis that will modify the stoichiometry of this component while maintaining charge neutrality in the composite electrode. The precursor electrodes can be activated either chemically or electrochemically by removing lithia and lithium from the layered $Li_2MnO_3$ and spinel $LiMn_{2-y}M_yO_4$ components, or by removing lithia alone if the components are, for example, $Li_2MnO_3$ (alternatively, $Li_2O \cdot MnO_2$) and $Li_{1.33}Mn_{1.67}O_4$ (y=0.33, alternatively, $Li_2O \cdot 2.5MnO_2$). The invention is extended to include activated electrodes in which the layered $Li_2MnO_3$ component is replaced by a layered $xLi_2MnO_3 \cdot (1-x)LiM'O_2$ (0<x<1) component having a composite structure, in which the M' ions of the layered $LiM'O_2$ subcomponent are selected from one or more first-row transition metal ions, optionally replaced by 10% or less of Li, Mg and/or Al ions.

The principles of this invention extend to include other activated electrodes in which either the $Li_2MnO_3$ or the $LiMn_{2-y}M_yO_4$ component of the $xLi_2MnO_3 \cdot (1-x)LiMn_{2-y}M_yO_4$ electrode precursor is replaced by a $Li_2O \cdot zMnO_2$ component containing lithia as a subcomponent, which does not have a layered- or spinel-type structure, such as $0.15Li_2O \cdot MnO_2$ (alternatively, $Li_2O \cdot 6.67MnO_2$; z=0.67) that can have a lithiated alpha-type $MnO_2$ structure or a lithiated gamma-type $MnO_2$ structure, the precursor electrodes being activated either chemically or electrochemically by removing lithia, or lithium and lithia, from their structures.

The electrodes of this invention can have structures in which the individual $Li_2MnO_3$, $LiMn_{2-y}M_yO_4$, $xLi_2MnO_3 \cdot (1-x)LiM'O_2$ and $Li_2O \cdot zMnO_2$ components are either structurally integrated with one another at the atomic level to form 'composite' electrode structures, or they can be comprised of physical mixtures or blends of the individual components or, alternatively, the individual components can be separated from one another in a compartmentalized electrode. The invention includes methods to synthesize the electrode precursors and methods to activate the precursors.

The electrodes of this invention can be used either in primary lithium cells and batteries or rechargeable lithium cells and batteries.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

FIG. 2 depicts X-ray diffraction patterns of $xLi_2MnO_3 \cdot (1-x)LiMn_{2-y}LiO_4$ precursor electrodes for x=0.7 and y=0.33, synthesized (a) at 400° C.; (b) at 600° C.; (c) 750° C. and (d) an acid-leached precursor electrode product derived from (a);

FIG. 3 depicts high-resolution transmission electron microscope images of a $xLi_2MnO_3 \cdot (1-x)LiMn_{2-y}Li_yO_4$ precursor electrodes for x=0.7, y=0.33, synthesized at 400° C.;

FIG. 4 depicts X-ray diffraction patterns of precursor electrodes (a) $xLi_2MnO_3 \cdot (1-x)LiMn_{2-y}Ni_yO_4$ synthesized at 400° C. for x=0.5 and y=0.5; and (b) $xLi_2MnO_3 \cdot (1-x)LiMn_{2-y}Co_yO_4$ synthesized at 400° C. for x=0.7 and y=0.2;

DETAILED DESCRIPTION OF THE PREFERRED EMBODIMENTS

Figure 1:
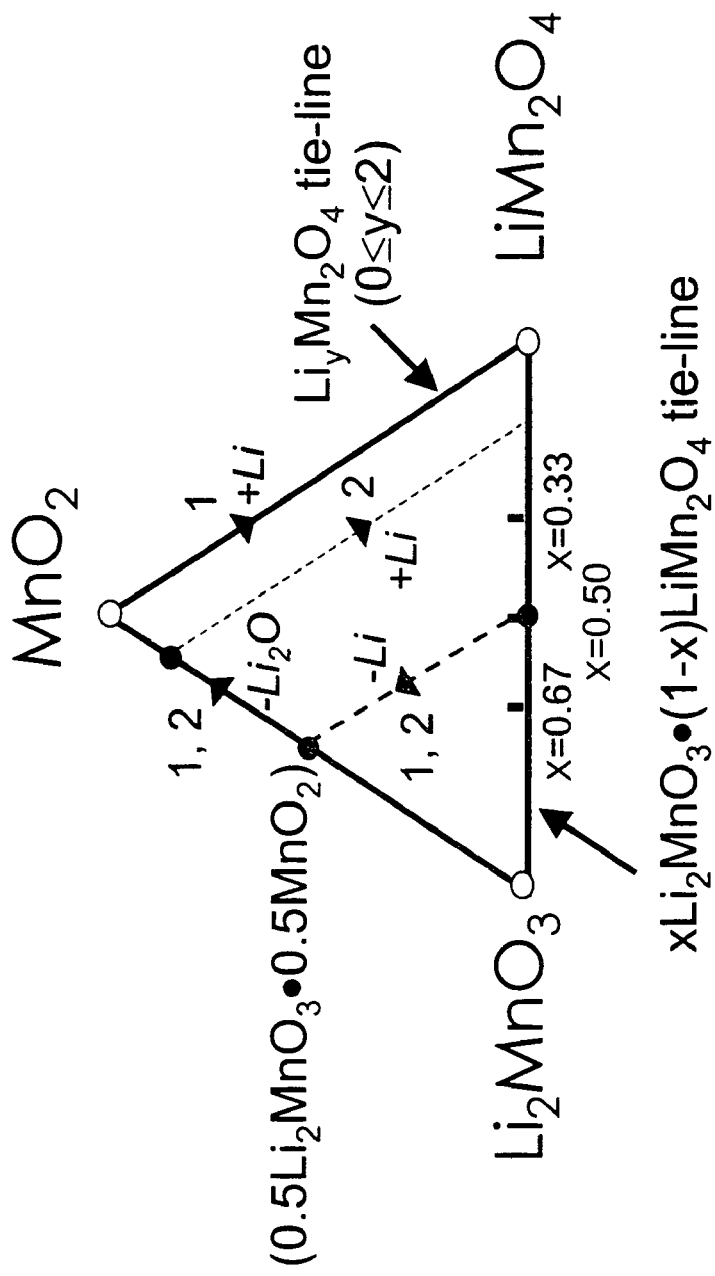
FIG. 1 depicts a schematic representation of a $Li_2MnO_3$—$MnO_2$—$LiMn_2O_4$ phase diagram.

State-of-the-art lithium-ion cells contain a $LiCoO_2$ positive electrode, a carbon negative electrode, typically graphite, and a non-aqueous electrolyte. A significant effort is being made by the lithium battery community to replace $LiCoO_2$ as the electrode material of choice because 1) it is relatively expensive, 2) it has a limited practical capacity (~140 mAh/g), and 3) in the charged state, delithiated $Li_{1-x}CoO_2$ electrodes are inherently unstable and unsafe in the lithium cell environment. Although considerable progress has been made in improving the electrochemical properties of the electrode by partially replacing cobalt by nickel, $LiCo_{1-x}Ni_xO_2$ electrodes (and other compositional modifications thereof) have not yet satisfactorily overcome the limitations mentioned above. On the basis of electrochemical potential, cost, capacity, safety and toxicity of metal oxide systems, manganese appears to be the most attractive first-row transition metal element to replace cobalt in the positive electrode of lithium-ion cells. Moreover, a wide range of manganese-oxide- and lithium-manganese-oxide structures exist, for example, one-dimensional tunnel structures such as alpha-$MnO_2$, beta-$MnO_2$ and gamma-$MnO_2$, two-dimensional layered (e.g., birnessite-type) structures and three-dimensional framework (e.g., spinel-type) structures. In many cases, lithium can be inserted into, and extracted from, the manganese oxide host framework without destroying the structural integrity of the host. Layered $LiMnO_2$ and substituted layered $LiMn_{1-y}M_yO_2$ electrode materials in which M is one or more metal ions such as Co, Ni, and Li have been reported in the literature, for example, by Bruce et al; in these instances, the precursor compounds from which the electrode materials are derived (by $Li^+$ ion-exchange) are layered $NaMnO_2$ or substituted $NaMn_{1-y}M_yO_2$ compounds, for example, as described in the Journal of Materials Chemistry, Volume 13, page 2367 (2003), the $LiMnO_2$ and substituted layered $LiMn_{1-y}M_yO_2$ electrode materials always containing some residual $Na^+$ ions, unlike the electrodes of this invention. Lithiated-manganese-oxide structures can also be fabricated and stabilized by introducing a lithia ($Li_2O$) component into several $MnO_2$ compounds, which can be represented generally as $Li_2O.zMnO_2$ compounds. Examples of such compounds are a lithia-stabilized hollandite-type $MnO_2$ tunnel structure ($Li_2O.6.67MnO_2$, alternatively, $0.15Li_2O.MnO_2$), a lithia-stabilized gamma-type $MnO_2$ tunnel structure ($Li_2O.6.67MnO_2$, alternatively, $0.15Li_2O.MnO_2$), a lithia-stabilized layered-type structure ($Li_2O.MnO_2$, alternatively, $Li_2MnO_3$), and a lithia-stabilized spinel-type structure ($Li_2O.2.5MnO_2$, alternatively, $Li_4Mn_5O_{12}$). The versatility of manganese-based systems therefore makes them particularly attractive for exploitation as electrodes in primary and rechargeable lithium cells and batteries, as highlighted in the Journal of Power Sources, Volumes 43-44, page 289 (1993) and in Progress in Solid State Chemistry, Volume 25, page 1 (1997).

This invention relates, in general, to metal oxide electrodes containing manganese for non-aqueous lithium cells and batteries. More specifically, the invention relates to activated electrodes having as a precursor thereof a lithium metal oxide containing manganese with the formula $xLi_2MnO_3.(1-x)LiMn_{2-y}M_yO_4$ for $0<x<1$ and $0 \leq y<1$ in which the $Li_2MnO_3$ and $LiMn_{2-y}M_yO_4$ components have layered and spinel-type structures, respectively, and in which M is one or more metal cations, said activated electrode being activated by removing lithia, or lithium and lithia, from said precursor, the M cations being selected from one or more monovalent, divalent, trivalent or tetravalent cations, preferably from $Li^+$, $Mg^{2+}$, $Ni^{2+}$, $Ni^{3+}$, $Co^{2+}$, $Co^{3+}$, $Al^{3+}$, $Ti^{4+}$ and $Zr^{4+}$ ions. Partial substitution of the manganese ions, or lithium and manganese ions, by M cations of the layered $Li_2MnO_3$ component may occur during synthesis that will modify the stoichiometry of this component while maintaining charge neutrality in the composite electrode. The precursor electrodes can be activated either chemically or electrochemically by removing lithia and lithium from the layered $Li_2MnO_3$ and spinel $LiMn_{2-y}M_yO_4$ components, or by removing lithia alone if the components are, for example, $Li_2MnO_3$ (alternatively, $Li_2O.MnO_2$) and $Li_{1.33}Mn_{1.67}O_4$ (y=0.33, alternatively, $Li_2O.2.5MnO_2$). When precursor electrodes such as $xLi_2MnO_3.(1-x)LiMn_{2-y}M_yO_4$ are activated electrochemically by both lithium and lithia removal, then the removal of lithium typically occurs before lithia removal with a concomitant oxidation of the Mn and/or M ions in the $LiMn_{2-y}M_yO_4$ spinel component of the electrode structure.

The invention is extended to include activated electrodes in which the layered $Li_2MnO_3$ component is replaced by a layered $xLi_2MnO_3.(1-x)LiM'O_2$ ($0<x<1$) component having a 'composite' structure, in which the M' ions of the layered $LiM'O_2$ subcomponent are selected from one or more first-row transition metal ions, optionally replaced by 10% or less of Li, Mg and/or Al ions.

The principles of this invention extend to include other activated electrodes in which either the $Li_2MnO_3$ or the $LiMn_{2-y}M_yO_4$ component of the $xLi_2MnO_3.(1x)LiMn_{2-y}M_yO_4$ electrode precursor is replaced by a $Li_2O.zMnO_2$ component containing lithia as a subcomponent, which does not have a layered- or spinel-type structure, such as $0.15Li_2O.MnO_2$ (alternatively, $Li_2O.6.67MnO_2$; z=0.67) with a lithiated alpha-type $MnO_2$ structure or a lithiated gamma-type $MnO_2$ structure, the precursor electrodes being activated either chemically or electrochemically by removing lithia, or lithium and lithia, from their structures. The individual components of the precursor electrodes of this invention can therefore have one-dimensional tunnel structures, two-dimensional layered structures or three-dimensional framework structures.

The electrodes of this invention can have structures in which the individual $Li_2MnO_3$, $LiMn_{2-y}M_yO_4$, $xLi_2MnO_3.(1-x)LiM'O_2$ and $Li_2O.zMnO_2$ components are either structurally integrated with one another at the atomic level, or they can be comprised of physical mixtures or blends of the individual components or, alternatively, the individual components can be separated from one another in a compartmentalized electrode. The invention includes methods to synthesize the electrode precursors and methods to activate the precursors. The electrode precursors can be synthesized or fabricated by high-temperature solid state reactions and or by physically mixing or blending the individual components of the electrode. Electrochemical activation of the electrode precursors occurs directly in a lithium cell, typically at a potential greater than 4.4 or 4.6 V vs. metallic lithium, whereas chemical activation of the precursors occurs, for example, by reaction of the composite precursor electrode structure with acid, such as sulfuric, hydrochloric or nitric acid, prior to cell assembly.

The electrodes of this invention can be used either in primary lithium cells and batteries or rechargeable lithium cells and batteries.

The principles of this invention are described first by reference to $Li_2MnO_3$ ($Li_2O.MnO_2$) that has a layered, rocksalt-type structure in which the lithium and manganese ions occupy all the octahedral sites. As such, $Li_2MnO_3$ cannot be used as an insertion electrode in lithium cells because the interstitial space, comprised of tetrahedra that share faces with neighboring octahedra, is energetically unfavorable for accommodating additional lithium. Moreover, lithium extraction is not possible because the manganese ions are tetravalent and cannot be easily oxidized at practical potentials. However, it has been demonstrated by Rossouw et al in the Materials Research Bulletin, Volume 26, page 463 (1991), that $Li_2MnO_3$ can be electrochemically activated by removing $Li_2O$ from the $Li_2MnO_3$ structure by chemical treatment to yield a $Li_{2-x}MnO_{3-x/2}$ product; this process is accompanied by some $H^+$—$Li^+$ ion-exchange. $Li_2MnO_3$ can also be activated electrochemically by $Li_2O$ removal in a lithium cell, as reported by Kalyani et al in the Journal of Power Sources, Volume 80, page 103 (1999), and by Robertson et al in Chemistry of Materials, Volume 15, page 1984 (2003) but these activated electrodes perform poorly in lithium cells. However, although $Li_{2-x}MnO_{3-x/2}$ electrodes, if used alone, tend to lose capacity when lithium cells are cycled, they can be highly effective in improving electrochemical properties when used as a component in a composite electrode, for example, in a two-component electrode system, $xLi_2MnO_3.(1-x)LiMO_2$ (M=Mn, Ni and Co) in which the $Li_2MnO_3$ and $LiMO_2$ components both have layered-type structures, as outlined in U.S. Pat. Nos. 6,677,082 and 6,680,143. The approach to designing composite electrodes in which there is a strong structural relationship between two layered $Li_2MnO_3$ and $LiMO_2$ components, typically for $x \leq 0.5$, is particularly effective when M is selected from both Mn and Ni ions, optionally with one or more other M ions, such as Co ions. For example, in $0.3Li_2MnO_3.0.7LiMn_{0.5}Ni_{0.5}O_2$ electrodes, when synthesized at high temperature, typically 900-1000° C., it has been demonstrated by Kim et al in Chemistry of Materials, Volume 16, page 1996 (2004) that the $Li_2MnO_3$ and $LiMn_{0.5}Ni_{0.5}O_2$ components are integrated at the atomic level to yield highly complex structures that have been referred to as 'composite' structures for simplicity and convenience.

Composite $0.3Li_2MnO_3.0.7LiMn_{0.5}N_{0.5}O_2$ electrodes can be electrochemically activated in lithium cells. During an initial charge, the electrochemical reaction is believed to occur predominantly by the following process, as described more fully by Kim et al in the above-mentioned reference. Lithium ions are initially extracted from the $LiMnO_{0.5}N_{0.5}O_2$ component with a concomitant oxidation of $Ni^{2+}$ to $Ni^{4+}$; the manganese ions remain tetravalent during this process. Thereafter, lithium is extracted from the $Li_2MnO_3$ component, typically at a potential greater than 4.4 or 4.6 V vs. metallic lithium ($Li_O$), with a concomitant loss of oxygen from the structure; the net result is a loss of $Li_2O$ from the $Li_2MnO_3$ component. On complete extraction of lithium from $0.3Li_2MnO_3.0.7LiMn_{0.5}Ni_{0.5}O_2$, the fully charged electrode has the composition $0.3MnO_2.0.7Mn_{0.5}Ni_{0.5}O_2$, or alternatively, $Mn_{0.65}Ni_{0.35}O_2$. In principle, therefore, this approach makes it possible to fabricate layered metal dioxides, and to tailor the concentration of a particular metal atom type in the structure, notably manganese.

It has now been discovered that the concept of integrating two layered structures such as $Li_2MnO_3$ and $LiMn_{0.5}Ni_{0.5}O_2$ to form a composite electrode structure, in which the two components are connected by a structurally compatible close-packed oxygen array, can be extended to other more complex systems such as composite layered-spinel $xLi_2MnO_3.(1-x)LiMn_{2-y}M_yO_4$ combinations that are comprised of different structure types. Composite layered-spinel structures are already known; they are produced when layered $LiMnO_2$ electrodes transform to spinel during electrochemical cycling as reported by Shao-Horn et al in the Journal of the Electrochemical Society, Volume 146, page 2404, 1999. However, a significant difference and advantage of using two-component $xLi_2MnO_3.(1-x)LiMn_{2-y}M_yO_4$ precursor electrodes over a one-component $LiMnO_2$ electrode, or more complex systems in which the layered $Li_2MnO_3$ component is replaced by a layered $xLi_2MnO_3.(1-x)LiM'O_2$ component having a 'composite' structure, as defined hereinbefore, is that it is possible to tailor the composition of the layered-spinel precursor electrode and the concentration of spectator $Mn^{4+}$ ions during an initial charge reaction to design an electrode that may offer a higher capacity and rate capability, and superior cycling stability compared to individual $LiMnO_2$— or state-of-the-art $LiCoO_2$ electrodes.

Moreover, it is known that layered $xLi_2MnO_3.(1-x)LiMO_2$ (M=Mn, Ni and Co) electrodes can offer exceptionally high electrode capacities, typically >200 mAh/g, whereas spinel electrodes, such as those derived from the $Li_{1+y}Mn_{2-y}O_4$ (0<y<0.33) system can offer a high rate capability. The combination of having both layered and spinel components, either structurally integrated or physically mixed or blended in a single electrode, or separated in electrode compartments within a single electrode therefore offers the possibility of designing new electrodes that offer both high capacity and rate over state-of-the art electrodes.

By way of example, a compositional phase diagram for a layered-spinel composite electrode system, $Li_2MnO_3$—$MnO_2$—$LiMn_2O_4$, is provided in FIG. 1. Taking $0.5Li_2MnO_3.0.5LiMn_2O_4$ (x=0.5), which lies on the $Li_2MnO_3$—$LiMn_2O_4$ tie-line in FIG. 1 as an example of the parent electrode, lithium extraction from the $LiMn_2O_4$ component during the initial charge changes the composition of the electrode along the dashed line (route 1) in FIG. 1 until the $0.5Li_2MnO_3.0.5MnO_2$ composition is reached on the $Li_2MnO_3$—$MnO_2$ tie-line; this process occurs at approximately 4 V vs. $Li^0$. Thereafter, $Li_2O$ is removed at a higher potential, typically above 4.4 V vs. metallic lithium, which drives the composition of the electrode toward the $MnO_2$ apex of the tie-triangle. Discharge of the fully-delithiated electrode along route 1 drives the composition to $LiMn_2O_4$ at which the average manganese oxidation state is 3.5. If the amount of lithia that is removed from the $0.5Li_2MnO_3.0.5MnO_2$ electrode is restricted to leave 20% $Li_2O$ in the charged electrode, then the electrode composition changes according to route 2 in FIG. 1. Under such circumstances, the fully charged electrode has the composition $0.2Li_2MnO_3.0.8MnO_2$ or, alternatively, $0.2Li_2MnO_3.0.4Mn_2O_4$. Following route 2, the composition of this electrode is $0.2Li_2MnO_3.0.4LiMn_2O_4$ when discharged to the $Li_2MnO_3$—$LiMn_2O_4$ (layered-spinel) tie-lie at which composition, the average manganese oxidation state in the electrode is 3.6. Composite $xLi_2MnO_3.(1-x)LiMn_2O_4$ electrode structures, like their layered-layered analogues, therefore provide a mechanism for controlling the changes in Mn-ion oxidation state during charge and discharge, which is critical to the electrochemical stability of both layered and spinel Li—Mn—O electrode structures in non-aqueous lithium cells. This approach of tailoring the composition and cation arrangement in layered-spinel electrodes and the manganese oxidation state in discharged electrodes can be extended more broadly to the $xLi_2MnO_3.(1-x)Li_{1+y}Mn_{2-y}O_4$ system in which the composition and $Li_2O$ content of the spinel component can be tailored as a function of y according to its position on $LiMn_2O_4$—$Li_4Mn_5O_{12}$ tie-line of the Li—Mn—O phase diagram.

The $Li_{1+y}Mn_{2-y}O_4$ spinel components of composite electrode precursors, such as $Li[Mn_{1.8}Li_{0.2}]O_4$, contain both $Mn^{3+}$ and $Mn^{4+}$ ions. Note, for example, that $Li[Mn_{1.8}Li_{0.2}]O_4$, in which y=0.2, can be reformulated as a sub-component composite electrode $0.67LiMn_2O_4 \cdot 0.33Li_4Mn_5O_{12}$ or as $0.67LiMn_2O_4 \cdot 0.67Li_2O \cdot 1.67MnO_2$ to highlight the $Li_2O$ component in the structure. By analogy with the reaction process described above for $0.5Li_2MnO_3 \cdot 0.5LiMn_2O_4$ electrodes, the composition of a $0.67LiMn_2O_4 \cdot 0.33Li_4Mn_5O_{12}$ $[Li[Mn_{1.8}Li_{0.2}]O_4]$ electrode would change first by removing lithium from the $LiMn_2O_4$ sub-component with a concomitant oxidation of $Mn^{3+}$ to $Mn^{4+}$ and, thereafter, by removing $Li_2O$ from the $Li_4Mn_5O_{12}$ sub-component at higher potentials.

Furthermore, it is possible to use an electrode precursor with a composition that falls on the tie-line between $Li_4Mn_5O_{12}$ (Li:Mn=0.8:1) and $Li_2MnO_3$ (Li:Mn=2:1) in the Li—Mn—O phase diagram. Such precursors, represented $xLi_2MnO_3 \cdot (1-x)Li_4Mn_5O_{12}$, have both layered- and spinel-type character. For example, a composite electrode in which the Li:Mn ratio is 1.2:1 would have the formula $5/7Li_2MnO_3 \cdot 2/7Li_4Mn_5O_{12}$, or alternatively, in approximate decimal notation, as $0.7Li_2MnO_3 \cdot 0.3Li_4Mn_5O_{12}$. It can be anticipated that charging these electrode precursors to high potential would yield, on complete extraction of lithium, a composite $MnO_2$-type structure with both layered and spinel-type character, and the applicants believe that a complex intergrown $MnO_2$ structure will contribute to providing enhanced structural stability over individual layered- and spinel-$MnO_2$ electrode structures in much the same way that gamma-$MnO_2$ electrodes contain an intergrown structure comprised of ramsdellite-$MnO_2$ domains and stabilizing pyrolusite-$MnO_2$ domains.

The principles of this invention can be extended to more complex precursor electrodes that contain more than one type of transition metal ion, notably those containing Ni and/or Co, such as electrodes derived from composite layered-spinel systems, e.g., $xLi_2MnO_3 \cdot (1-x)LiMn_{2-y}Ni_yO_4$, $xLi_2MnO_3 \cdot (1-x)LiMn_{2-y}Co_yO_4$ and $xLi_2MnO_3 \cdot (1-x)LiMn_{2-y-z}Ni_yCo_zO_4$. For 0<x<1 and 0≦y<1, these substituted electrodes have a manganese content that is higher than the substituted metal content. For example, the percentage of manganese in a layered-spinel composite electrode, $0.7Li_2MnO_3 \cdot 0.3LiMn_{1.5}Ni_{0.5}O_4$, is 88% of the total transition metal content.

It should be noted, however, that the formula $0.7Li_2MnO_3 \cdot 0.3LiMn_{1.5}Ni_{0.5}O_4$ is written as a simple two-component system for convenience; in practice, it is highly likely that the layered $Li_2MnO_3$ component may contain some Ni in the Mn and/or Li layers, which would modify the composition of the layered and spinel components to maintain the stoichiometry of, and charge balance within, the electrode structure. Even more complex electrode precursors exist if, for example, the $Li_2MnO_3$ component is replaced by a layered $xLi_2MnO_3 \cdot (1-x)LiM'O_2$ component, such as $0.7Li_2MnO_3 \cdot 0.3LiMn_{0.5}Ni_{0.5}O_2$, described hereinbefore, which has its own characteristic composite structure.

A particular advantage of using a composite electrode with a $LiMn_{2-y}Ni_yO_4$ spinel component such as $LiMn_{1.5}Ni_{0.5}O_4$ is that this component delivers its capacity at high potentials vs. metallic lithium, typically between 5 and 2.5 V vs. lithium. The composition of $xLi_2MnO_3 \cdot (1-x)LiMn_{2-y}Ni_yO_4$, $xLi_2MnO_3 \cdot (1-x)LiMn_{2-y}Co_yO_4$ and $xLi_2MnO_3 \cdot (1-x)LiMn_{2-y-z}Ni_yCo_zO_4$ precursor electrodes is selected preferably such that after electrochemical activation in lithium cells, the average manganese oxidation state is close to, or preferably higher than, 3.5+ at the discharged composition to minimize or eliminate damaging effects in the electrode, such as a crystallographic Jahn-Teller distortion that occurs typically in lithium-manganese-oxide spinel electrodes when the average manganese oxidation state falls below 3.5+, or electrode dissolution that can occur, particularly at high potentials, by the disproportionation of $Mn^{3+}$ ions into $Mn^{2+}$ and $Mn^{4+}$ ions.

The applicants believe that, in most cases, it will not be easy to remove all the lithium from the composite structure of the precursor electrodes of this invention during the initial charge and to form a fully delithiated (activated) product and that some residual lithium in the structure may help to stabilize the charged electrode. This invention therefore covers compositions of partially charged precursor electrodes as well as fully-charged (i.e., fully-delithiated or fully activated) precursor electrodes. Moreover, the applicants believe that the loss of oxygen that accompanies the initial charge process may play a critical role in forming, by reaction with the electrolyte, a protective layer at the surface of the charged electrode.

The $Li_2MnO_3$, $LiMn_{2-y}M_yO_4$, $xLi_2MnO_3 \cdot (1-x)LiM'O_2$ and $Li_2O \cdot zMnO_2$ components in the precursor electrodes of this invention, when synthesized, may not be ideally stoichiometric. For example, the manganese ions in a spinel component such as $Li_4Mn_5O_{12}$ (alternatively, $Li_2O \cdot 2.5MnO_2$) may be partially reduced to provide mixed $Mn^{4+/3+}$ valence in the initial electrode, the degree of reduction being related to the temperature used during synthesis. For example, electrochemical data have shown that when a $0.7Li_2MnO_3 \cdot 0.3Li_4Mn_5O_{12}$ precursor electrode is synthesized (i.e., with a Li:Mn ratio=1.2:1 in the starting materials) at 400° C., the manganese ions are predominantly tetravalent whereas, when synthesized at 750° C., the electrochemical profiles show that the precursor electrode is partially reduced, having a formula close to $0.7Li_2MnO_3 \cdot 0.3Li_4Mn_5O_{11}$ or, alternatively, close to $0.6Li_2MnO_3 \cdot 0.4LiMn_2O_4$.

The invention includes experimental methods for fabricating the precursor electrodes such as conventional sol-gel techniques, high-temperature solid state reactions or, alternatively, physically mixing or blending individual components together, for example, mixing or blending a $Li_2MnO_3$ component with a layered-type structure with a $0.15Li_2O \cdot MnO_2(Li_{0.3}MnO_{2.15})$ component with a hollandite-type structure to yield a $xLi_2MnO_3 \cdot (1-x)Li_{0.3}MnO_{2.15}$ electrode, or mixing or blending a $Li_4Mn_5O_{12}$ spinel component with a $0.15Li_2O \cdot MnO_2(Li_{0.3}MnO_{2.15})$ component to yield a $xLi_4Mn_5O_{12} \cdot (1-x)Li_{0.3}MnO_{2.15}$ electrode. The invention also includes experimental methods for activating the precursor electrodes by removing lithia ($Li_2O$), or lithium and lithia therefrom, either electrochemically in lithium cells at potentials typically greater than 4.4 or 4.6 V vs. Li°, or chemically, for example, by reaction with acid, such as sulfuric acid, hydrochloric acid or nitric acid. The ability to remove $Li_2O$ from $Li_2MnO_3$ or other $Li_2O \cdot zMnO_2$ components by acid treatment has implications for using this method to reduce the first-cycle irreversible capacity loss of the electrodes of this invention, notably $xLi_2MnO_3 \cdot (1-x)LiMn_{2-y}M_yO_4$ electrodes. Complete removal of $Li_2O$ from the $Li_2MnO_3$ component leaves $MnO_2$. It stands to reason, therefore, that for every two $Li^+$ ions that are removed from each $Li_2MnO_3$ unit, only one $Li^+$ ion can be reinserted to yield the discharged rocksalt composition, $LiMnO_2$. Acid treatment may also remove $Li_2O$ from the $LiMn_{2-y}M_yO_4$ component according to a mechanism reported by Hunter for single-phase $LiMn_2O_4$ (y=0) in the Journal of Solid State Chemistry, Volume 39, page 142 (1981). The $H^+$-ion and/or water content that results in acid-treated $xLi_2MnO_3 \cdot (1-x)LiMn_{2-y}M_yO_4$ electrodes can be reduced by annealing the electrodes at ~300° C. prior to cell assembly. In principle, therefore, acid-treatment of $xLi_2MnO_3 \cdot (1-x)LiMn_{2-y}M_yO_4$ electrodes can be used as a method to tailor the amount of lithium in the positive electrode (cathode) that is required to fully charge the negative electrode (anode) of a lithium-ion cell, such as graphite, and simultaneously to balance the first-cycle irreversible capacity loss that occurs at both anode and cathode.

The principles of this invention are extended to include activated electrodes derived from precursor electrodes that are comprised of a combination of individual layered and spinel components, either physically mixed or blended with one another in intimate form, or separated from one another in a compartmentalized electrode. Such combinations of components may be used to optimize the capacity and rate capability of the overall electrode over electrodes with 'composite' structures, as defined herein, by gaining maximum benefit, for example, from a layered electrode component that offers a high capacity and a spinel component that offers a high rate capability. In this instance, the layered component can be comprised either of $Li_2MnO_3$ alone, or it can be comprised of a composite $xLi_2MnO_3 \cdot (1-x)LiM'O_2$ component for $0<x<1$ in which M' is typically one or more first-row transition metal ions, selected preferably from Mn, Co and Ni, optionally in the presence of a non-transition metal ions such as Li, Mg or Al ions.

The following examples describe the principles of the invention as contemplated by the inventors, but they are not to be construed as limiting examples.

EXAMPLE 1

Lithium-manganese-oxide precursor electrode powders, having a Li:Mn ratio in accordance with the two-component composite system, $xLi_2MnO_3 \cdot (1-x)Li_4Mn_5O_{12}$ were synthesized for x=5/7 (written hereafter as 0.7) by reacting $LiOH \cdot H_2O$ and $Mn(OH)_y$ (y~2) in a 1.2:1.0 molar ratio. After intimate grinding, the mixtures of $LiOH \cdot H_2O$ and $Mn(OH)_y$ were pressed into pellets and fired at various temperatures between 400, 600 and 750° C. in air for 5 h. The products were cooled to room temperature in the furnace.

The X-ray diffraction patterns of the $0.3Li_2MnO_3 \cdot 0.7Li_4Mn_5O_{12}$ products prepared at 400° C., 600° C. and 750° C. are shown in FIGS. 2a, 2b and 2c, respectively. The X-ray diffraction data in FIGS. 2b and 2c show that the layered and spinel components are more readily distinguished from one another in the composite structure, as indicated particularly by the broad peak at approximately 22° 2θ and the better resolved doublet peak at approximately 65° 2θ (arrowed in FIGS. 2b and 2c). Heating the product from 400 to 750° C. releases oxygen which drives the composition of the spinel component from $Li_4Mn_5O_{12}$ toward $LiMn_2O_4$, as monitored by an increase in the lattice parameter of the spinel component that changes from 8.134 Å in the product synthesized at 400° C. to 8.219 Å in the product synthesized at 750° C.; accordingly, the concentration of the $Li_2MnO_3$ component increases to maintain the required Li:Mn ratio in the composite electrode. These data indicate that the sample synthesized at 400° C. has a composition close to $0.3Li_2MnO_3 \cdot 0.7Li_4Mn_5O_{12}$, whereas the oxygen-deficient product synthesized at 750° C. has a composition that approximates $0.7Li_2MnO_3 \cdot 0.3Li_4Mn_5O_{11}$ or alternatively, $0.6Li_2MnO_3 \cdot 0.4LiMn_2O_4$.

HRTEM images of the $0.7Li_2MnO_3 \cdot 0.3Li_4Mn_5O_{12}$ products, synthesized at 400° C., show a coexistence of layered- and spinel-type regions, confirming the composite character of their structures (FIGS. 3a and 3b).

EXAMPLE 2

The $0.3Li_2MnO_3 \cdot 0.7Li_4Mn_5O_{12}$ electrode precursor synthesized at 400° C. in Example 1 was activated by treatment with a 0.1 M $HNO_3$ aqueous solution for 20 hours at room temperature. The ml/g ratio of acid to solids was 60. During this treatment, the pH of the reaction solution changed from pH=1.0 to a pH of approximately 4.0 indicating that some lithium and/or lithia ($Li_2O$) had been extracted from the $0.3Li_2MnO_3 \cdot 0.7Li_4Mn_5O_{12}$ structure, possibly together with some $H^+$-ion exchange for $Li^+$ within the structure. After washing the product with distilled water until the filtrate was approximately neutral, the resultant acid-leached product was dried in an oven at 120° C. in air for ~16 hours. The X-ray diffraction pattern of the chemically-activated electrode product is shown in FIG. 2d. For the electrochemical evaluation, the product was heated at 300° C. in air for 6 hours. During this process, the product lost approximately 3.4% of its mass, which was attributed to the removal of water, and/or the loss of oxygen (with a concomitant reduction of manganese) from the surface and bulk of the electrode structure.

EXAMPLE 3

Electrode precursors with formulae $xLi_2MnO_3 \cdot (1-x)LiMn_{2-y}Ni_yO_4$ were prepared from $M(OH)_y$ (M=Mn, Ni; y~2) and $LiOH \cdot H_2O$ reagents using the required amounts of Mn, Ni, and Li for a given value of x. The $M(OH)_y$ reagent was prepared by co-precipitation of the required amounts of the nitrate salts, $M(NO_3)_2$. After intimate grinding, the mixtures of $M(OH)_y$ and $LiOH \cdot H_2O$ were pressed into pellets and fired at various temperatures between 400 and 600° C. in air for 5 h. The products were cooled to room temperature in the furnace. The X-ray diffraction pattern of a $xLi_2MnO_3 \cdot (1-x)LiMn_{2-y}Ni_yO_4$ product prepared at 400° C. for x=0.5 and y=0.5 is shown in FIG. 4a.

EXAMPLE 4

Electrode precursors with formulae $xLi_2MnO_3 \cdot (1-x)LiMn_{2-y}Co_yO_4$ were prepared from $M(OH)_y$ (M=Mn,Co; y~2) and $LiOH \cdot H_2O$ reagents using the required amounts of Mn, Co, and Li for a given value of x. The $M(OH)_y$ reagent was prepared by co-precipitation of the required amounts of the nitrate salts, $M(NO_3)_2$. After intimate grinding, the mixtures of $M(OH)_y$ and $LiOH \cdot H_2O$ were pressed into pellets and fired at various temperatures between 400 and 600° C. in air for 5 h. The products were cooled to room temperature in the furnace. The X-ray diffraction pattern of a $xLi_2MnO_3 \cdot (1-x)LiMn_{2-y}Co_yO_4$ product prepared at 400° C. for x=0.7 and y=0.2 is shown in FIG. 4b.

EXAMPLE 5

Electrode precursors were activated and evaluated in coin cells (size 2032) 20 mm diameter and 3.2 mm high against a counter lithium electrode. The cells had the configuration: Li/1M $LiPF_6$ in ethylene carbonate (EC), diethyl carbonate (DEC) (1:1)/cathode precursor. Laminated electrodes were made containing approximately 7 to 10 mg of the cathode precursor powder, i.e., approximately 82% by weight of the laminate electrode, intimately mixed with approximately 10% by weight of a polyvinylidene difluoride (Kynar PVDF polymer binder) and approximately 8% by weight of carbon (graphite, such as Timcal SFG-6, or acetylene black, such as Chevron XC-72) in 1-methyl-2-pyrrolidinone (NMP). The slurries were coated with a doctor blade onto an aluminum foil substrate current collector. The laminated electrodes were dried under a vacuum at 70° C. Electrode discs, approximately 1.4 cm in diameter were punched from the laminates. Metallic lithium foil was used as the counter electrode. The cells were discharged and charged at constant current (typically 0.1 to 0.25 mA/cm$^2$) between voltage limits that varied typically between an upper limit of 4.95 V and a lower limit of 2.0 V.

Figure 5A:
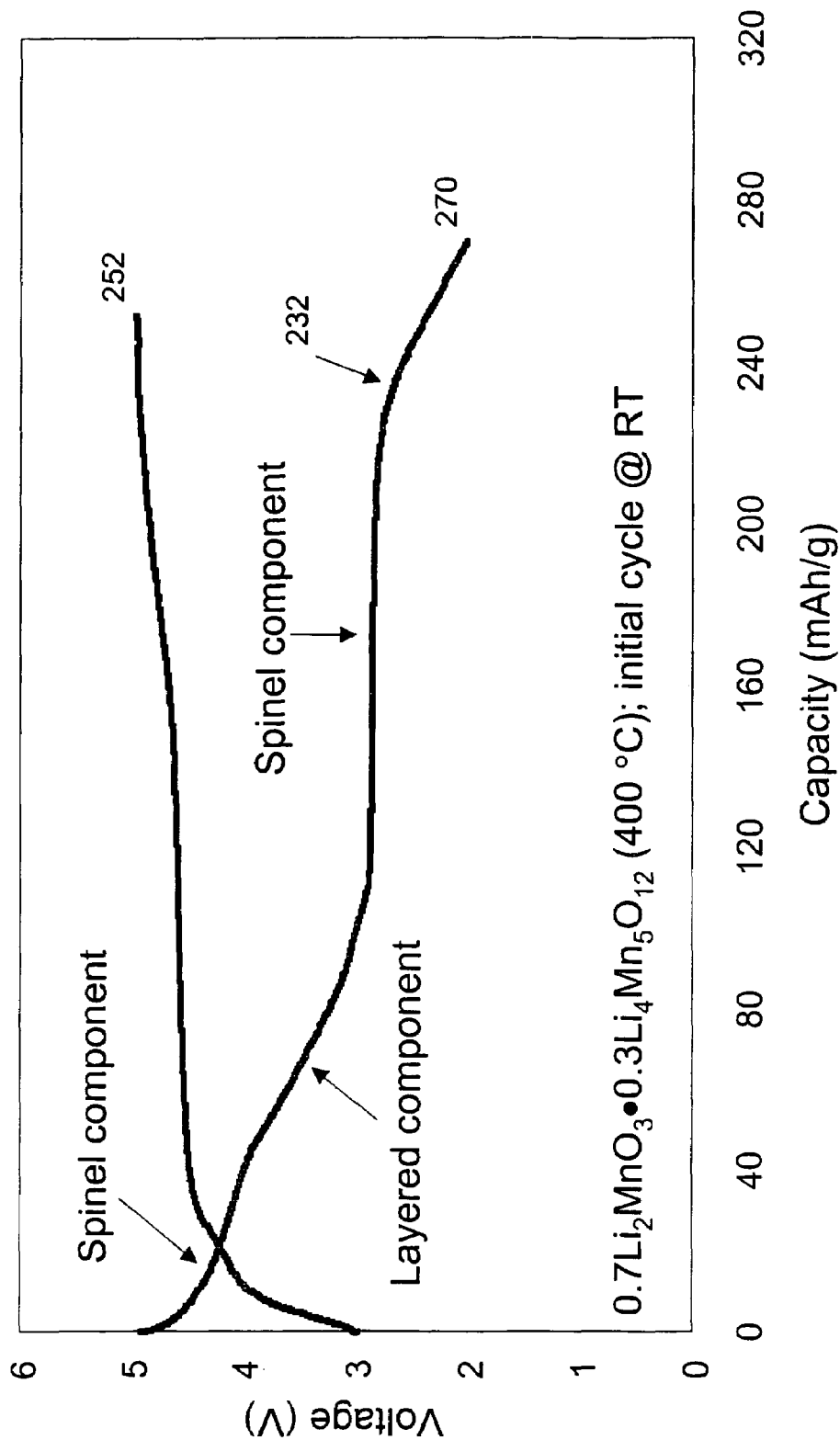
FIG. 5 depicts (a) the initial charge/discharge profile of a lithium cell, operated at room temperature, in which the cathode precursor is $xLi_2MnO_3 \cdot (1-x)LiMn_{2-y}Li_yO_4$ for x=0.7; y=0.33 and (b) the capacity vs. cycle number plot of cycles 1-10 of this cell.

FIG. 5a shows the initial charge/discharge voltage profile between 5 and 2 V of a lithium cell containing a 0.7Li$_2$MnO$_3$.0.3Li$_4$Mn$_5$O$_{12}$ (x=0.7) precursor electrode prepared at 400° C. The small amount of capacity that is withdrawn between 3 and 4 V during the initial charge indicates that the Li$_4$Mn$_5$O$_{12}$ component in the electrode is not ideally stoichiometric and that it contains a small concentration of Mn$^{3+}$ ions. Thereafter, two voltage plateaus distinguish the removal of Li$_2$O from the layered and spinel components. The first plateau between 4.5 and 4.7 V is attributed to the extraction of Li$_2$O from the Li$_2$MnO$_3$ component because this potential is consistent with removal of Li$_2$O from the Li$_2$MnO$_3$ component of xLi$_2$MnO$_3$.(1-x)LiMn$_{0.5}$Ni$_{0.5}$O$_2$ electrodes as reported by Kim et al in Chemistry of Materials, Volume 16, page 1996 (2004); the process at higher potential (4.7-5.0 V) is consistent with reports of lithium extraction from Li$_4$Mn$_5$O$_{12}$ at ~5 V by Dahn et al in Solid State Ionics, Volume 73, page 81 (1994) and by Manthiram et al in Electrochemical and Solid State Letters, Volume 6, page A249 (2003).

Figure 5B:
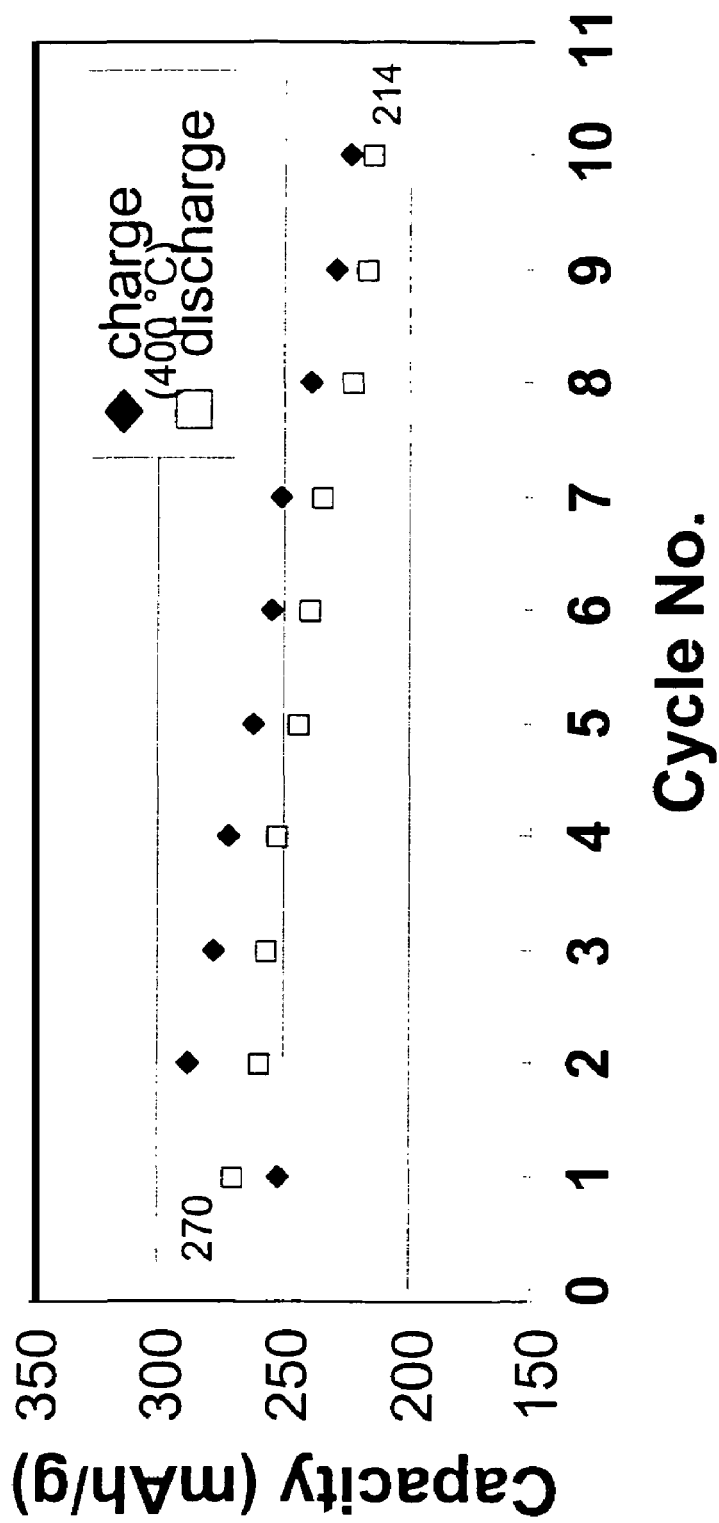

The capacity withdrawn from the 0.7Li$_2$MnO$_3$.0.3Li$_4$Mn$_5$O$_{12}$ precursor electrode during the initial cycle (252 mAh/g, FIG. 5a) corresponds to the removal of 83% of the Li$_2$O content in 0.7Li$_2$MnO$_3$.0.3Li$_4$Mn$_5$O$_{12}$ (alternatively, 1.3Li$_2$O.2.2MnO$_2$). Under such circumstances, the composition of the charged electrode is 0.22Li$_2$O.2.2MnO$_2$ and the composition of the fully discharged electrode, 0.22Li$_2$O.2.2LiMnO$_2$. The theoretical capacity that can be delivered by this electrode is 256 mAh/g (based on the mass of the parent 0.7Li$_2$MnO$_3$.0.3Li$_4$Mn$_5$O$_{12}$ compound) in good agreement with the experimental value (270 mAh/g) obtained when the cell was discharged to 2.0 V (FIG. 5a). The high capacity delivered by the 0.7Li$_2$MnO$_3$.0.3Li$_4$Mn$_5$O$_{12}$ activated electrode during the first discharge to the end of the second plateau at approximately 2.7 V (232 mAh/g) therefore demonstrates, unequivocally, that Li$_2$O is removed from the electrodes during the initial charge to activate the Li$_4$Mn$_5$O$_{12}$ and Li$_2$MnO$_3$ components. The shape of the discharge curve in FIG. 5a is characteristic of a composite electrode with both spinel and layered-type structural features, consistent with the HRTEM images of the electrode shown in FIGS. 3a and 3b; the initial two processes that occur between 5 and 3 V have distinct spinel- and layered-type character, respectively, whereas the voltage plateau at ~3 V is characteristic of the two-phase reaction (spinel-to-rocksalt transition) of a lithium-manganese-oxide spinel electrode. FIG. 5b is a capacity vs. cycle number plot of a Li/0.7Li$_2$MnO$_3$.0.3Li$_4$Mn$_5$O$_{12}$ cell that shows that an exceptionally high capacity (>250 mAh/g) can be obtained from the composite electrode of this invention during the early cycles. The initial discharge capacity (270 mAh/g) is particularly attractive for primary lithium cells and batteries.

Figure 6:
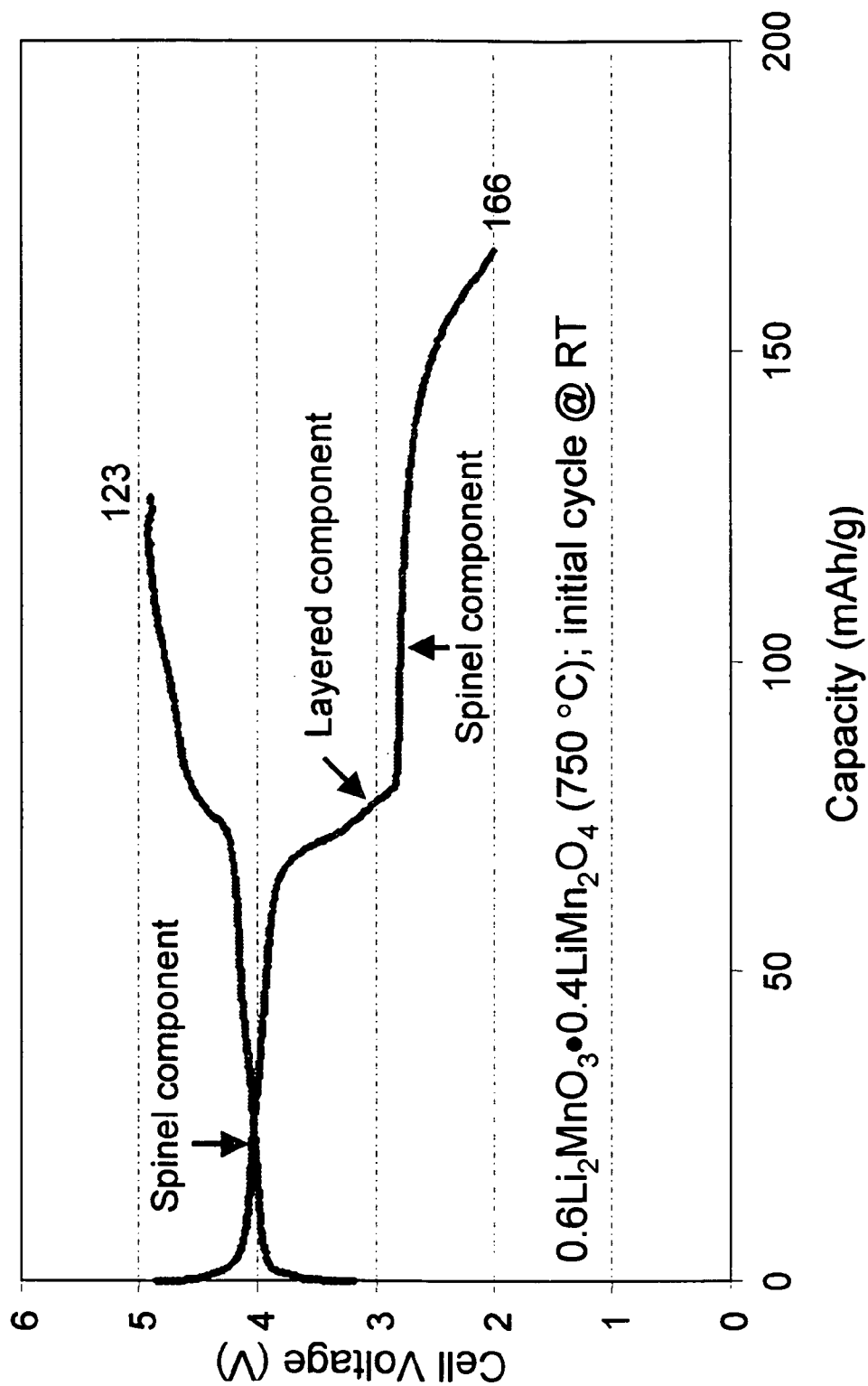
FIG. 6 depicts the initial charge/discharge profile of a lithium cell, operated at room temperature, in which the cathode precursor is $xLi_2MnO_3 \cdot (1-x)LiMn_2O_4$ for x=0.6.
Figure 7:
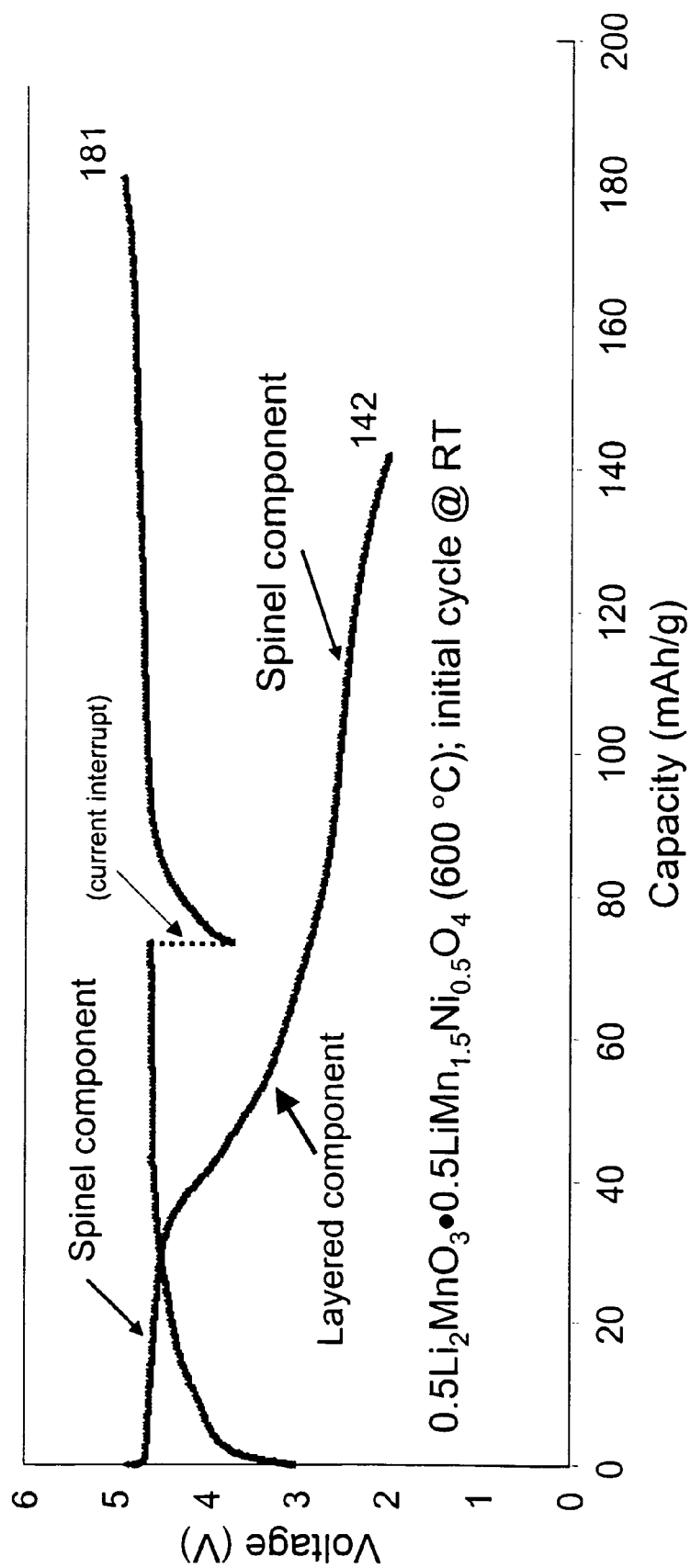
FIG. 7 depicts the initial charge/discharge profile of a lithium cell, operated at room temperature, in which the cathode precursor is $xLi_2MnO_3 \cdot (1-x)LiMn_{2-y}Ni_yO_4$ for x=0.5 and y=0.5.
Figure 8:
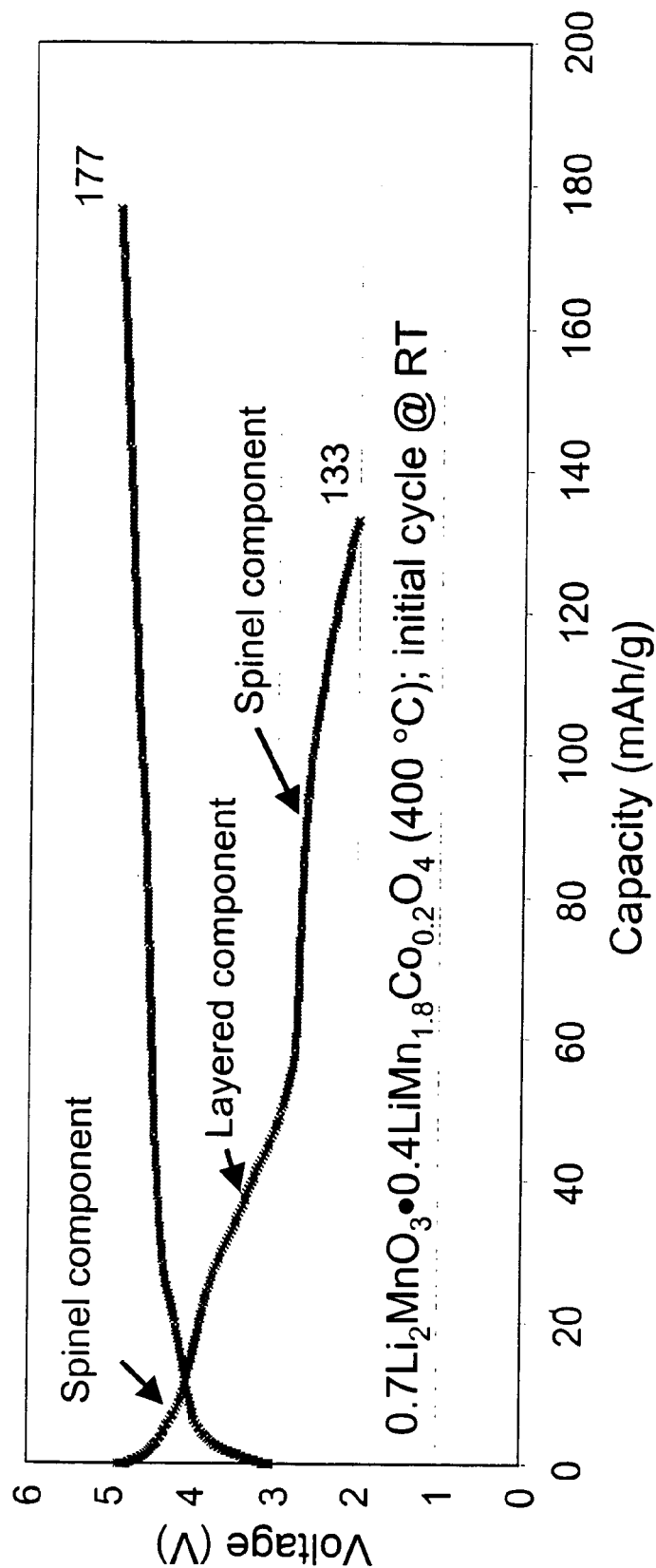
FIG. 8 depicts the initial charge/discharge profile of a lithium cell, operated at room temperature, in which the cathode precursor is $xLi_2MnO_3 \cdot (1-x)LiMn_{2-y}Co_yO_4$ for x=0.7 and y=0.2.

The principle of using layered-spinel composite electrodes is further demonstrated in FIGS. 6 to 8 by the initial charge/discharge voltage profiles of cells with other electrode compositions. FIG. 6 shows the initial charge/discharge voltage profile of a lithium cell (4.95-2.0 V) containing the precursor electrode of Example 1, synthesized at 750° C., with the approximate formula 0.6Li$_2$MnO$_3$.0.4LiMn$_2$O$_4$. The initial charge of this cell occurs at a significantly lower potential (4.0-4.2 V) than that for the Li/0.7Li$_2$MnO$_3$.0.3Li$_4$Mn$_5$O$_{12}$ cell in FIG. 5, consistent with lithium extraction from a spinel component resembling LiMn$_2$O$_4$, rather than Li$_2$O extraction from a Li$_4$Mn$_5$O$_{12}$ component that typically occurs between 4.5 and 4.95 V. Furthermore, the discharge profile shows strong spinel-type character, consistent with a reduction in concentration of the layered Li$_2$MnO$_3$ component in the composite structure as a result of the high synthesis temperature (750° C.). The inferior capacity delivered by the 0.6Li$_2$MnO$_3$.0.4LiMn$_2$O$_4$ electrode (FIG. 6) compared to the 0.7Li$_2$MnO$_3$.0.3Li$_4$Mn$_5$O$_{12}$ electrode (FIG. 5a) emphasizes the need to control and optimize the synthesis temperature and the relative amounts of layered- and spinel components in the precursor electrode structures.

FIG. 7 shows the initial charge/discharge voltage profile (4.95-2.0 V) of a Li/0.5Li$_2$MnO$_3$.0.5LiMn$_{1.5}$Ni$_{0.5}$O$_{12}$ cell (x=0.5; y=0.5). FIG. 8 shows the corresponding charge/discharge voltage profile of a Li/0.7Li$_2$MnO$_3$.0.3LiMn$_{1.8}$Co$_{0.2}$O$_{12}$ cell (x=0.7; y=0.2). The voltage profiles of both cells show both spinel- and layered character, consistent with the principles of this invention. It is evident that the initial charge/discharge cycle of these cells is coulombically inefficient, which is attributed predominantly due to Li$_2$O loss from the Li$_2$MnO$_3$ component of the precursor electrode during the charging (activation) process. The advantages of having a Li$_2$O component in the electrode structure are (i) the lithium from the Li$_2$O component can be used offset the irreversible first-cycle capacity loss that typically occurs at the negative electrodes (anodes) of lithium-ion cells such as carbon (e.g., graphite), metal or intermetallic electrodes, and (ii) that oxygen, which is lost through the removal of Li$_2$O from the positive electrode, may contribute to the formation of a protective, passivating layer to counter electrolyte oxidation at high cell voltages.

Figure 9:
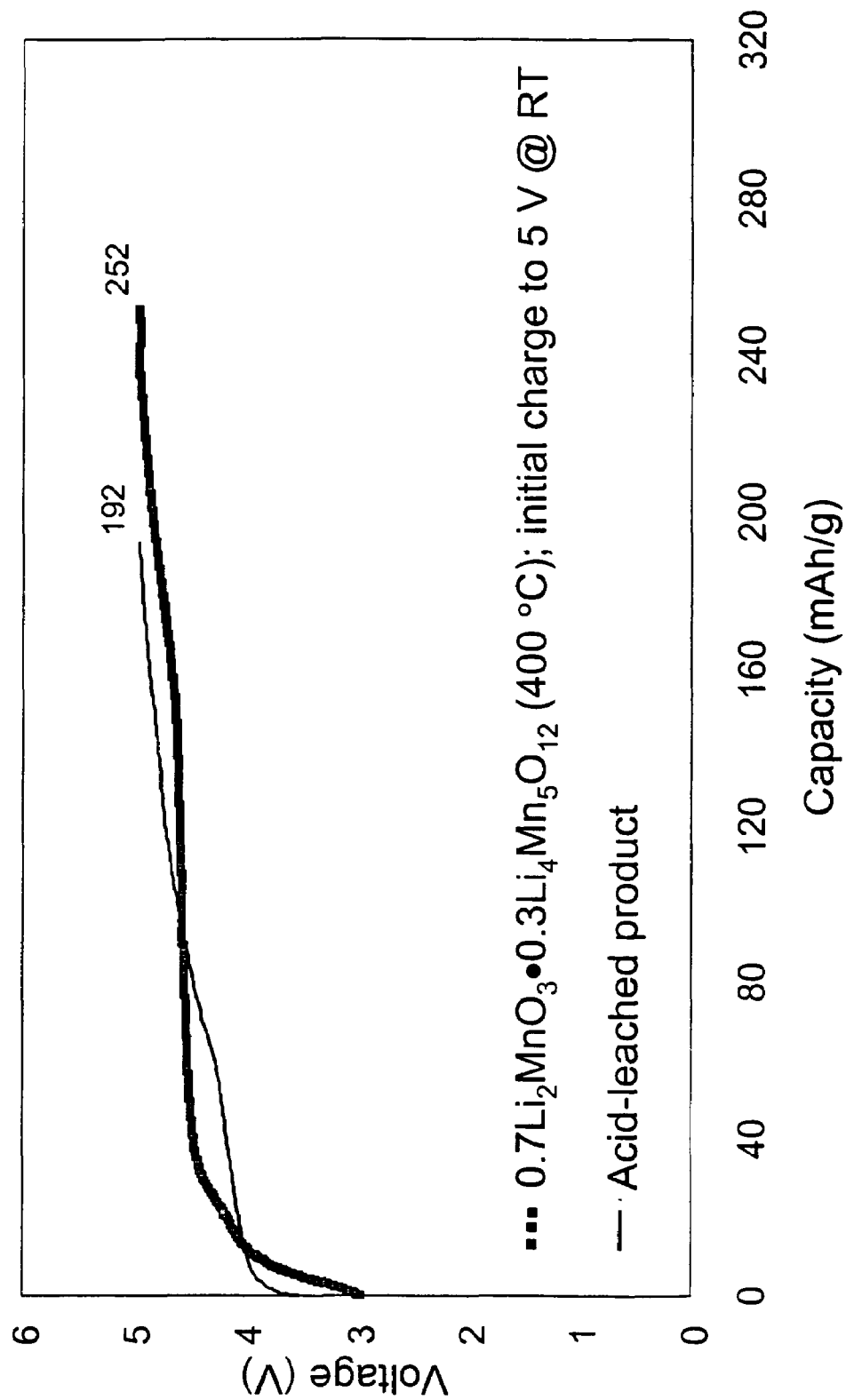
FIG. 9 depicts (a) the initial charge profile of a lithium cell, operated at room temperature, in which the cathode precursor is $xLi_2MnO_3 \cdot (1-x)LiMn_{2-y}Li_yO_4$ for x=0.7; y=0.33 and (b) the initial charge profile of a similar lithium cell in which the $xLi_2MnO_3 \cdot (1-x)LiMn_{2-y}Li_yO_4$ cathode precursor had been activated with acid.

FIG. 9 shows a comparison of the initial charge voltage profile of cells when charged to 5 V containing a) a 0.7Li$_2$MnO$_3$.0.3Li$_4$Mn$_5$O$_{12}$ (x=0.7) precursor electrode prepared at 400° C. and b) an acid treated 0.7Li$_2$MnO$_3$.0.3Li$_4$Mn$_5$O$_{12}$ electrode. The first plateau between 4.5 and 4.7 V that was attributed to the extraction of Li$_2$O from the Li$_2$MnO$_3$ component in profile a), as also shown in FIG. 5a, is substantially altered and reduced in length in profile b). Furthermore, the initial capacity obtained from the acid-treated 0.7Li$_2$MnO$_3$.0.3Li$_4$Mn$_5$O$_{12}$ precursor electrode (192 mAh/g) is considerably less than that obtained from the parent 0.7Li$_2$MnO$_3$.0.3Li$_4$Mn$_5$O$_{12}$ precursor electrode (252 mAh/g), consistent with the chemical extraction of Li$_2$O from the 0.7Li$_2$MnO$_3$.0.3Li$_4$Mn$_5$O$_{12}$ and the chemical activation of the electrode in accordance with the principles of this invention.

Whereas the examples of composite precursor electrodes with layered and spinel components as represented by the general formula xLi$_2$MnO$_3$.(1-x)LiMn$_{2-y}$M$_y$O$_4$, in which M=Li, Co and/or Ni, 0<x<1, and 0≦y<1, and their activation by electrochemical or chemical methods, demonstrate the principle of this invention, it can be readily understood that the invention can be extended to include other M substituent ions and other $xLi_2MnO_3 \cdot (1-x)LiM'O_2$ or $Li_2O \cdot zMnO_2$ components, as described herein, without detracting from the novelty of the invention and to allow further tailoring of the electrode composition to optimize the capacity, power and electrochemical cycling stability of primary and rechargeable lithium cells and batteries.

Figure 10:
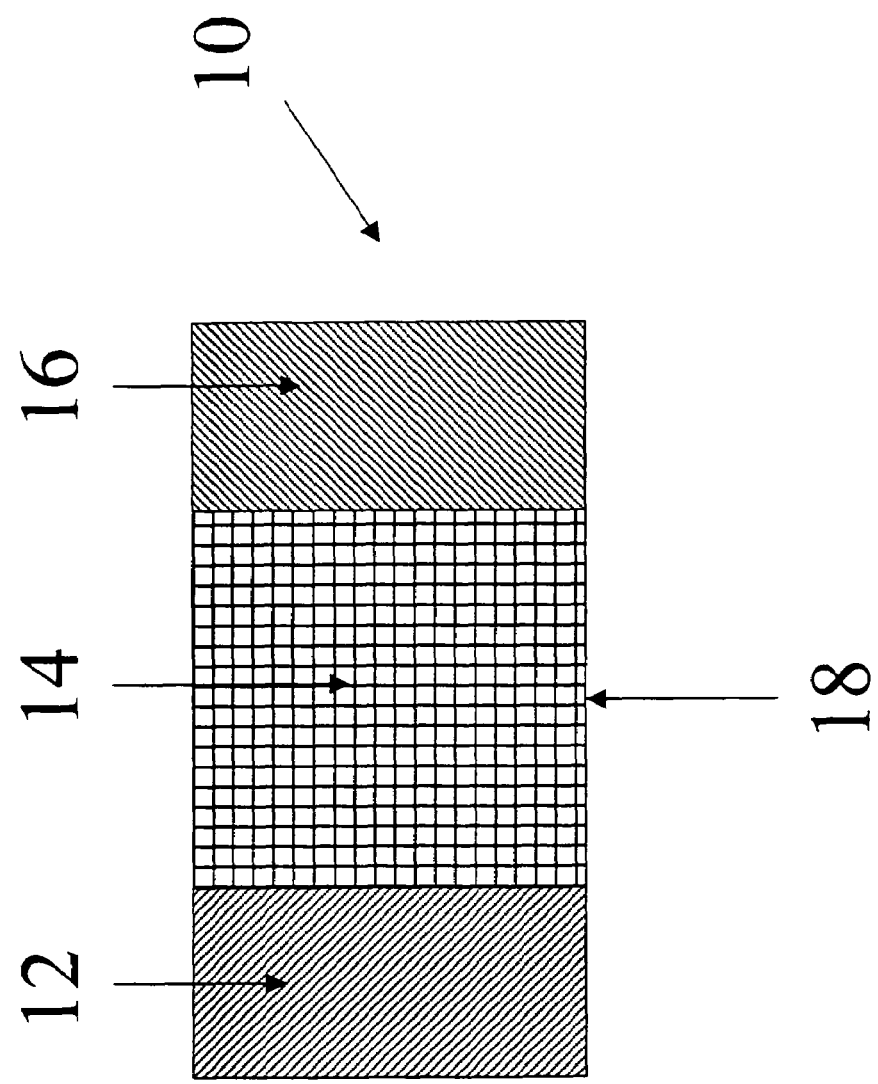
FIG. 10 depicts a schematic representation of an electrochemical cell.
Figure 11:
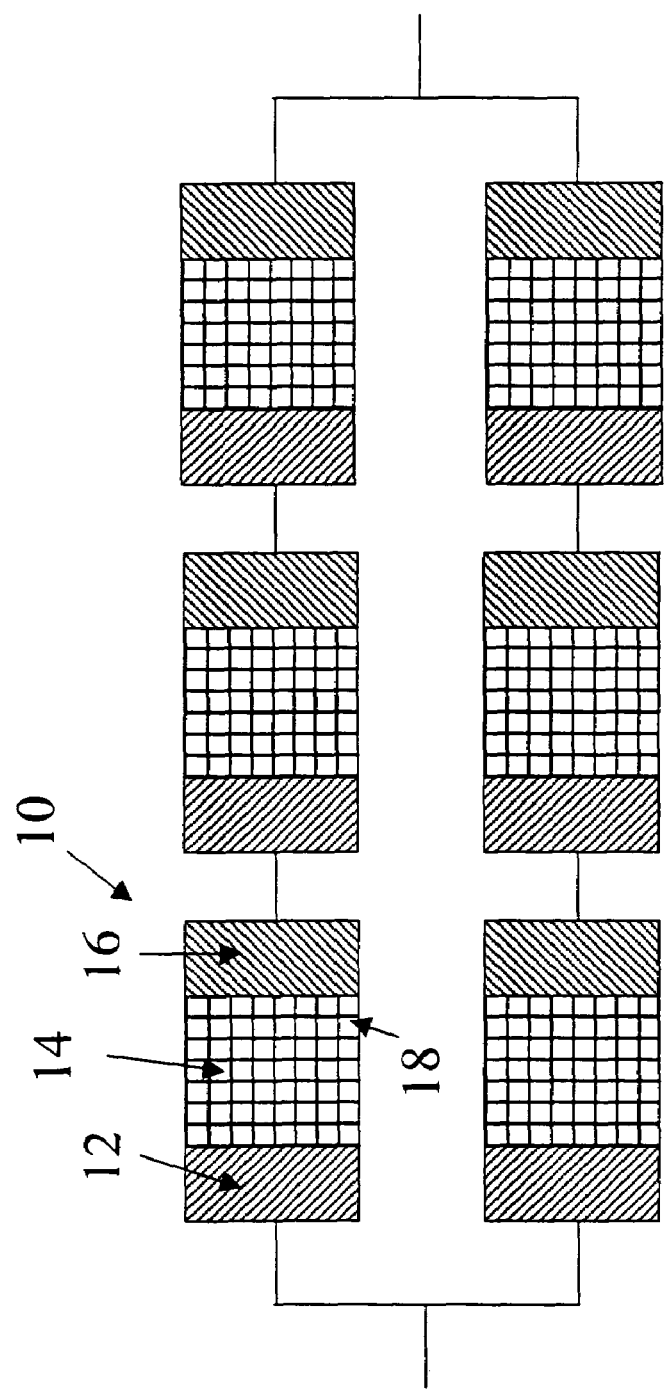
FIG. 11 depicts a schematic representation of a battery consisting of a plurality of cells connected electrically in series and in parallel.

This invention, therefore, relates to lithium-metal-oxide precursor electrodes for non-aqueous electrochemical lithium cells and batteries, a schematic illustration of the lithium cell shown in FIG. 10, the cell being represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 11 shows a schematic illustration of one example of a battery in which two strings of electrochemical lithium cells, described above, are arranged in parallel, each string comprising three cells arranged in series.

While there has been disclosed what is considered to be the preferred embodiments of the present invention, it is understood that various changes in the details may be made without departing from the spirit, or sacrificing any of the advantages of the present invention and that additional improvements in the capacity and stability of the electrodes can be expected to be made in the future by improving and optimizing the composition of the precursor lithium-metal-oxide electrode structures and the processing techniques whereby the electrodes are activated either chemically by acid treatment prior to the construction of electrochemical lithium cells, or electrochemically, or a combination thereof.

The embodiments of the invention in which an exclusive property or privilege is claimed are defined as follows:

1. An activated electrode for a non-aqueous electrochemical cell, having as a precursor thereof a lithium metal oxide with the formula $xLi_2MnO_3 \cdot (1-x)LiMn_{2-y}M_yO_4$ for $0<x<1$ and $0 \leq y<1$ in which the $Li_2MnO_3$ and $LiMn_{2-y}M_yO_4$ components have layered and spinel-type structures, respectively, and in which M is one or more metal cations, said activated electrode being activated by removing lithia, or lithium and lithia, from said precursor.

2. An activated electrode according to claim 1, in which M is one or more monovalent, divalent, trivalent or tetravalent cations.

3. An activated electrode according to claim 2, in which M is one or more $Li^+$, $Mg^{2+}$, $Ni^{2+}$, $Ni^{3+}$, $Co^{2+}$, $Co^{3+}$, $Al^{3+}$, $Ti^{4+}$ and $Zr^{4+}$ ions.

4. An activated electrode according to claim 1, in which the manganese ions, or the lithium and manganese ions of the $Li_2MnO_3$ component are partially substituted by M cations.

5. An activated electrode according to claim 1, in which the components are partially reduced to provide mixed $Mn^{4+/3+}$ valence in the precursor electrode.

6. An activated electrode of according to claim 1, in which the electrode precursor is activated electrochemically.

7. An activated electrode of claim 1, in which the electrode precursor is activated chemically with acid.

8. An activated electrode of claim 1 and further including a negative electrode, and an electrolyte, said activated electrode being activated by removing lithia, or lithium and lithia, from said precursor, thereby forming an electrochemical cell.

9. An activated electrode for a non-aqueous electrochemical cell, having as a precursor thereof a lithium metal oxide with the formula $xLi_2MnO_3 \cdot (1-x) LiMn_{2-y}M_yO_4$ for $0<x<1$ and $0 \leq y<1$ in which the $Li_2MnO_3$ and $LiMn_{2-y}M_yO_4$ components have layered and spinel-type structures, respectively, and in which M is one or more metal cations, said activated electrode being activated by removing lithia, or lithium and lithia, from said precursor, wherein the $Li_2MnO_3$ component of the electrode precursor is replaced by a layered $xLi_2MnO_3 \cdot (1-x) LiM'O_2$ component in which M' is selected from one or more first-row transition metal ions and $0<x<1$.

10. An activated electrode according to claim 9, in which M is one or more monovalent, divalent, trivalent or tetravalent cations.

11. An activated electrode according to claim 9, in which M' is selected from Mn, Co and Ni ions.

12. An activated electrode according to claim 9, in which M' is replaced by 10% or less of Li, Mg and/or Al ions.

13. An activated electrode according to claim 9, in which the individual components of the electrode are either physically mixed with one another, or separated from one another in a compartmentalized electrode.

14. An activated electrode according to claim 9, in which the components are partially reduced to provide mixed $Mn^{4+/3+}$ valence in the precursor electrode.

15. An activated electrode of claim 9, and further including a negative electrode, and an electrolyte, wherein said $Li_2MnO_3$ component of the positive electrode precursor is replaced by a layered $xLi_2MnO_3 \cdot (1-x)LiM'O_2$ component in which M' is selected from one or more first-row transition metal ions and $0<x<1$, thereby forming an electrochemical cell.

16. An activated electrode for a non-aqueous electrochemical cell, having as a precursor thereof a lithium metal oxide with the formula $xLi_2MnO_3 \cdot (1-x)LiMn_{2-y}M_yO_4$ for $0<x<1$ and $0 \leq y<1$ in which the $Li_2MnO_3$ and $LiMn_{2-y}M_yO_4$ components have layered and spinel-type structures, respectively, and in which M is one or more metal cations, said activated electrode being activated by removing lithia, or lithium and lithia, from said precursor, wherein either the $Li_2MnO_3$ or $LiMn_{2-y}M_yO_4$ component of the electrode precursor is replaced by a $Li_2O \cdot zMnO_2$ component that does not have a layered- or a spinel-type structure.

17. An activated electrode of claim 16, and further including a negative electrode, and an electrolyte, wherein either the $Li_2MnO_3$ or $LiMn_{2-y}M_yO_4$ component of the positive electrode precursor is replaced by a $Li_2O \cdot zMnO_2$ component that does not have a layered- or a spinel-type structure, thereby forming an electrochemical cell.

18. A plurality of electrochemical cells of claim 8 arranged in parallel and/or in series to form a battery.

19. A plurality of electrochemical cells of claim 15 arranged in parallel and/or in series to form a battery.

20. A plurality of electrochemical cells of claim 17 arranged in parallel and/or in series to form a battery.

* * * * *

UNITED STATES PATENT AND TRADEMARK OFFICE
CERTIFICATE OF CORRECTION

PATENT NO. : 7,303,840 B2  Page 1 of 1
APPLICATION NO. : 11/057790
DATED : December 4, 2007
INVENTOR(S) : Michael M. Thackeray, Christopher S. Johnson and Naichao Li It is certified that error appears in the above-identified patent and that said Letters Patent is hereby corrected as shown below:

Title Page,
In the Abstract (57), line 4, delete $0 \leq y < 1$" and insert -- $0 \leqq y < 1$ --.

Signed and Sealed this

Seventeenth Day of June, 2008

JON W. DUDAS
*Director of the United States Patent and Trademark Office*